United States Patent
Denollin

(10) Patent No.: US 11,091,650 B2
(45) Date of Patent: *Aug. 17, 2021

(54) METHOD FOR HANDLING A SLAG POT OR LADLE AND PYROMETALLURGICAL TOOLS

(71) Applicant: S. A. Lhoist Recherche et Developpement, Ottignies-Louvain-la-Neuve (BE)

(72) Inventor: Guillaume Denollin, Havre (BE)

(73) Assignee: S. A. Lhoist Recherche et Developpement, Ottignies-Louvain-la (BE)

( * ) Notice: Subject to any disclaimer, the term of this patent is extended or adjusted under 35 U.S.C. 154(b) by 117 days.

This patent is subject to a terminal disclaimer.

(21) Appl. No.: 16/466,880

(22) PCT Filed: Dec. 7, 2017

(86) PCT No.: PCT/EP2017/081824
§ 371 (c)(1),
(2) Date: Jun. 5, 2019

(87) PCT Pub. No.: WO2018/104448
PCT Pub. Date: Jun. 14, 2018

(65) Prior Publication Data
US 2019/0316844 A1    Oct. 17, 2019

(30) Foreign Application Priority Data
Dec. 8, 2016 (BE) .................................. 2016/5909

(51) Int. Cl.
| | | |
|---|---|---|
| C09D 7/63 | (2018.01) |
| F27D 1/00 | (2006.01) |
| C09D 1/00 | (2006.01) |
| C09D 7/40 | (2018.01) |
| C09D 1/10 | (2006.01) |
| C09D 5/02 | (2006.01) |
| C21B 3/10 | (2006.01) |
| F27D 1/16 | (2006.01) |

(52) U.S. Cl.
CPC ................. *C09D 1/00* (2013.01); *C09D 1/10* (2013.01); *C09D 5/024* (2013.01); *C09D 7/63* (2018.01); *C09D 7/69* (2018.01); *C21B 3/10* (2013.01); *F27D 1/0006* (2013.01); *F27D 1/1636* (2013.01); *F27D 1/1684* (2013.01)

(58) Field of Classification Search
CPC ... C09D 1/00; C09D 7/69; C09D 7/63; C09D 1/10; C09D 5/024; C21B 3/10; F27D 1/0006; F27D 1/1636; F27D 1/1684
See application file for complete search history.

(56) References Cited

U.S. PATENT DOCUMENTS

| | | | |
|---|---|---|---|
| 3,243,397 A | 3/1966 | Herklimer et al. | |
| 3,821,008 A * | 6/1974 | Jordan et al. | C04B 24/38 106/205.9 |
| 5,300,144 A * | 4/1994 | Adams | B22C 1/26 106/124.2 |
| 5,437,890 A | 8/1995 | Gramke | |
| 2019/0316844 A1* | 10/2019 | Denollin | F27D 1/0006 |
| 2019/0376746 A1* | 12/2019 | Denollin | F27D 3/1545 |

FOREIGN PATENT DOCUMENTS

WO     2005092990 A1    10/2005

OTHER PUBLICATIONS

PCT/EP2017/081824, International Search Report, dated Jan. 28, 2018, 2 pages.

* cited by examiner

*Primary Examiner* — Scott R Kastler
(74) *Attorney, Agent, or Firm* — Whitaker Chalk Swindle & Schwartz PLLC; Charles D. Gunter, Jr.

(57) ABSTRACT

Method for handling a slag pot or ladle or pyro-metallurgical tools comprising the steps of spraying a mineral suspension onto a wall and putting into service of said slag pot or ladle or of the pyro-metallurgical tool, wherein said mineral suspension comprises calcium particles in suspension in an aqueous phase forming a calcium particle slurry containing a carbon hydrate at a content between 0.2 and 3%.

14 Claims, No Drawings

METHOD FOR HANDLING A SLAG POT OR LADLE AND PYROMETALLURGICAL TOOLS

1. FIELD OF THE INVENTION

This invention relates to the handling of slag pots and ladles used in the ferrous or non-ferrous metallurgical industry.

2. BACKGROUND OF THE INVENTION

Typically, the pyro-metallurgical industry produces slag which floats on top of the pool of molten metal duo to its density which is less than that of the molten metal.

The collection of the slag is carried out in different ways. A first technique resides in the tipping of the pot wherein it is supernatant above the pool of molten metal. The slag can also be collected by scraping or by overflow during the tipping.

It is then recovered in slag pots or ladies, which are typically led from refractory materials, cast iron or steel.

In the ferrous metallurgical industry, blast furnace slag and steel-making slag are distinguished.

The blast furnace slag is a by-product coming from the production of cast iron in a blast furnace, where it corresponds to the sterile gangue of the iron ore to which is added alloying elements and fuel ash, in particular coke, coal and/or alternative fuels. It therefore separates from the liquid iron by a difference in density.

The quantity of slag produced is proportional to the richness of the iron ore used. For a blast furnace operating with a prepared charge with a base of iron-rich ore, a proportion 180 to 300 kg of slag is generally reached for one tonne of cast iron produced.

The steel-making slag comes from pyro-metallurgical tools, such as various refining tools such as cast iron desulphurisation tools, converters that transform the cast iron into steel (BOF-Basic Oxygen Furnace), electric furnaces (EAF-Electric Arc Furnace), stainless steel refining converters (AOD-Argon Oxygen Decarburization) and the various tools for secondary metallurgy grading. For one tonne of steel produced, there is from 50 to 150 kg of steel-making slag produced.

The steel-making slag has for function to assemble the impurities and the undesirable chemical elements. The latter have in the vast majority of cases the form of oxides. They are generally generated during the use of the pyro-metallurgical tool concerned.

For this, it is essential to manage the composition thereof, in such a way as to make it reactive. A high lime content will, for example, make the slag able to capture the phosphorus oxides at the converter, which renders the use thereof as a fertilizer able to be considered. With ladle metallurgy, a high lime content renders the slag basic, which is favourable for the rapture of alumina inclusions. However, this slag must also allow for refractory bricks.

This invention relates more particularly to the field of handling slag pots and ladles but also crucibles and shells, for example, without however being limited thereto, made of steel or cast iron, used in metal preparation workshops in ferrous or non-ferrous metallurgy.

More particularly, the slag, concerned in the framework of this invention is steel-making or non-ferrous metallurgy slag.

In the framework of this invention, we shall simply refer to as "slag pots", the pots, ladles, and similar item made of steel or cast iron, such as for example those intended for collecting slag from steel mills or from the metallurgical industry.

In the metallurgical industry, the handling of slag pots is often entrusted to subcontractors, with the slag pots being a part of shell at often belongs to the metallurgical industry.

The handling of slag pots therefore comprises a series of well-controlled steps of which the subcontractor is in charge. It among other things entails conveying the slag pots between the pro-metallurgical tool and the slag drop-off site where it will be stored and/or recycled, pouring out the contents and returning the pots to the furnace in order to again collect slag there.

Among other things during the conveying of slag pots, for safety reasons, the slag pots should be kept above 150° C. in order to prevent any accumulation of water. Indeed, this would generate explosions during the pouring of the slag itself at a temperature of more than 1,200° C. It is therefore consequently a common practice to heat the slag pots before they are put into service.

During the use in regime of the slag pots, the temperatures thereof remain stable and most often above 250° C. thanks to the accumulation and the retention of the heat coming from the slag. The difference in the expansion coefficient between the slag and the material forming the pot should indeed generate disbanding when the temperature of the pot fluctuates. However, during a use in regime, the latter does not fluctuate enough to generate disbonding. Consequently, the formation of "skull" is favoured. This invention aims among other things to overcome this shortfall.

Of course, the formation of "skull" is inherent to the process and occurs in all cases. However, it can occur in a manner that is more or less substantial according to whether or not the handling is optimal.

The formation of "skull" is also a function of the steel-making tool that generated the slag. Some being by physical and chemical nature more ready than others in the forming of skull.

In addition, when the cleaning of slag pots is long and "deskulling" is required (mechanically removing the layer of skull that is adhering to the walls of the slag pot), the slag pots cool down substantially following exposure to the climatic conditions and to the duration of the method of "deskulling". They must then be heated later. However, this heating represents a substantial calorific energy that is too expensive to allow for a return to the optimal temperature ranges around 250° C. Also, generally, after cleaning, the pots are heated around 150° C. for the safety reasons mentioned hereinabove.

Nowadays, a mineral layer can be deposited onto the inner wall of slag pots. This solution mainly plays on the formation of intermediate slag layers. For example, this deposited mineral layer can involve the formation of an intermediate slag layer by means of an endothermic reaction which provides a cooling effect, or on the contrary, the formation of an intermediate phase with a higher melting point, or playing on other effects in relation with a phase transformation, such as adjusting the expansion or the shrinking.

These techniques mentioned hereinabove use mainly refractory suspensions or lime and slag mineral suspensions as a mixture. However, these suspensions include compounds in a mixture of which the composition has an impact on the composition of the slag of which the chemical properties are as such modified, such as for example the basicity (determined by the ratio of the quantity of the basic elements to the quantity of acid elements in the solid fraction), basicity which is modified by adapting the basicity of the suspension according to the basicity of the slag poured into the slag pot or ladle.

Although these technical solutions entailing suspensions are currently considered as operating correctly, they are also highly dependent on the chemical composition and on the homogeneity of the slag which is poured into the slag pots or ladies. Consequently, as the composition of the slag is not frankly always homogeneous, as the global composition thereof can also vary from one tool to another or even vary over time for the same tool, the composition of these suspensions must also be adapted, which makes the method particularly complex and highly manual. This is for example described in document U.S. Pat. No. 5,437,890.

Document U.S. Pat. No. 5,437,890 discloses a pre-treatment for slag pot walls made of refractory materials with a substantially mineral mixture comprising lime, slag fines and water in order to prevent the adherence of the slag to the refractory walls, which destroy the walls of the pot.

In the past, sometimes, lime suspensions were used in this type of application. The workshops of the metallurgical industry roughly produced a lime suspension, which had many disadvantages such as for example low effectiveness, a substantial thickness in the coating on the walls, the presence of residual water in the pot or in the slag ladle, which represents a danger, very dirty and complex applications, highly manual and finally, these solutions were very expensive compared to the low results obtained in terms of the simplification of the handling.

Documents JP2015094020 and document JPS63295458 for example mention treatment by lime suspensions.

For example, document JP2015094020 discloses a treatment of the inner surface of slag pots by spraying a lime suspension to be used in the method of recycling hot slag during the carrying out of the desulphurisation treatment. The tubing for spraying the lime suspension is connected to a lime suspension reservoir, wherein the lime suspension has a concentration in lime from 13.5 to 15% by weight in relation to the total weight of the lime suspension. The excess lime suspension and washing water both sprayed onto the inner surface of slag pots returns to the lime suspension reservoir.

Document JPS63295458 also discloses diet slaked lime is supplied on the wall of the slag pots in order to facilitate the emptying of slag from the pot, when the latter is cooled and caking. However, this document does not disclose any characteristics of the lime, or how, or even at what quantity it is applied onto the inner wall of the slag pots. In addition, it does not describe anything as to the depositing of the slag via overflow. On the contrary, according to this document, the caking of the slag is awaited in order to withdraw it from the slag pot or ladle.

As can be observed, the existing techniques use either mineral suspensions of which the composition is complex and requires formulation steps that can be adapted to the composition of the slag or mineral suspensions that are very rough, uncontrolled and finally not very effective. There is therefore a need to procure for the sector of handling slag pots or ladles a solution, that is optimised, simple to implement and effective.

SUMMARY OF THE INVENTION

The invention has for purpose overcome the disadvantages of prior art by procuring a method that procures an optimised pre-treatment of the slag pots and ladles made of steel or cast iron so as to facilitate the handling of the latter on the steel-making or pyro-metallurgical sites between the point of collection of the slag on the steel-making or pyro-metallurgical tool and the pouring of the slag in a drop-off site, typically a landfill.

In order to resolve this problem, it is provided according to the invention a method for handling a slag pot or ladle comprising an inner wall and an outer wall, said method comprising the steps of a) collecting a slag in said slag pot or ladle of a pyro-metallurgical tool, b) transporting said slag pot or ladle from said pyro-metallurgical tool to said slag drop-off site, typically at the landfill, c) emptying of said pot or ladle at said slag drop-off site, typically at the landfill in order to eliminate the slag that it contains, d) spraying of a mineral suspension onto said inner wall of said slag pot or ladle, prior to at least one step of said collecting of said slag, in such a way as to line said inner wall with a mineral layer, and e) putting into service of said slag pot or ladle lined with said mineral layer for the purpose of collecting slag a).

The method according to this invention is characterised in that said mineral layer is a thin layer and in that said mineral suspension comprises an aqueous phase, a mineral phase and possibly additives, said mineral suspension has a carbon hydrate content between 0.2 and 3% preferably between 0.4 and 2%, more preferably between 0.5 and 1.5%, more advantageously between 0.5% and 1% by weight in relation to the total weight of said mineral suspension.

In terms of this invention, the term "putting into service" means the putting into circulation of the slag pot or ladle for the role that is expected of a slag pot or ladle, namely the collection of slag.

Particularly advantageously, in the method according to this invention, said mineral layer, lined on the inner wall has a layer thickness between 0.1 and 5 mm, preferably between 0.15 and 3 mm, more preferably between 0.2 and 2 mm, in particular between 0.5 and 1 mm.

DETAILED DESCRIPTION OF THE INVENTION

As can be observed, when a mineral suspension having a carbon hydrate content between 0.2 and 3% by weight, in relation to the total weight of said mineral suspension, is lined on the inner wall of the slag pots or ladles, it was surprisingly observed that the slag that is poured therein did not adhere or adhered very little at the time of pouring out at the landfill. The mineral layer formed as such acts as a stripping agent forming a layer that substantially reduces the formation of skull via a substantial reduction in the adherence between the slag pot or ladle and the slag that is poured therein.

In terms of this invention, the terms "slag pot or ladle lined with a mineral layer on a surface" means that approximately 70%, for example more than 80%, in particular more than 85%, even more than 90% of the surface is lined with a thin and homogeneous mineral layer.

At the time of the spraying of the mineral suspension containing a carbon hydrate, the water contained in the suspension evaporates almost instantly in contact with the hot wall. This generates a rapid increase in the concentration of carbon hydrate until typically forming a weak adhesive that favours the adherence of the solid particles to the walls of the slag pot, also due to the temperature of the slag pot or ladle, which is greater than 100° C.

At the time of the pouring of the slag into the slag pot or ladle, at the furnace outlet, the temperature of the slag, a priori produces a calcining reaction of the carbon hydrate, which facilitates the stripping of the slag with this phenomenon occurring starting at 700° C.

Indeed, the thin mineral layer formed by spraying typically makes it possible to produce a shear plane behind the mineral layer (at the interface between the inner wall of the slag pot or ladle and the mineral layer) at the time of the overflowing of the slag into the slag pot or ladle. The shear plane can be produced because the presence of the carbon hydrate a priori plays the role of a weak adhesive, in comparison with the potential adherence of the slag to the inner wall of the slag pot or ladle.

Then, the mineral layer "glued" onto the inner wall of the slag pot or ladle is comprised of fine mineral particles. The temperature of the slag pot or ladle, just before the overflowing of the slag has a temperature typically from 100° C. to 350° C., a temperature at which the mineral particles are stable. The mineral layer can therefore be applied onto the slag pot or ladle well before the use thereof. The slag pots or ladles coated as such, can even be stored.

In a particular embodiment, wherein said mineral phase contains calcium particles, chosen from the group comprised of slaked lime, decarbonated dolomite at least partially slaked, lime and mixtures thereof.

In this case, if the calcium particles are slaked lime or decarbonated dolomite at least partially hydrated, at the time of the overflowing of the slag into the slag pot or ladle, at the furnace outlet, the temperature of the slag a priori produces a calcining reaction of the carbon hydrate simultaneously with the dehydration of the calcium hydrate which facilitates the stripping of the slag, these phenomena occur starting at 700° C.

Calcium oxide, CaO, is often called "quick lime", while calcium hydroxide, $Ca(OH)_2$, is called "hydrated lime" or "slaked lime", with both compounds sometimes informally referred to as "lime". In other terms, lime is an industrial product respectively with a calcium hydroxide or oxide base.

The term "quick lime" means a solid mineral material of which the chemical composition is mainly calcium oxide, CaO. Quick lime is generally obtained by calcinating lime (mainly comprised of $CaCO_3$).

Quick lime can also contain impurities such as magnesium oxide, MgO, sulphur oxide, $SO_3$, silica, $SiO_2$, or alumina, $Al_2O_3$, etc., of which the sum is at a rate of a few by weight. The impurities are expressed here in their oxide form, but of course, they can appear in difference phases. Quick lime also generally contained a few % by weight of residual lime, called unfired residue.

The suitable quick lime according to this invention can include MgO, expressed in the form of MgO, in a quantity included within the range from 0.6 to 10% by weight, preferably less than or equal to 5% by weight, more preferably less than or equal to 3% by weight, most preferably less than or equal to 1% by weight in relation to the total weight of the quick lime.

Typically, in order to form slaked lime, quick lime is used in the presence of water. The calcium oxide in the quick lime reacts quickly with water to form calcium dihydroxide $Ca(OH)_2$, in the form of slaked lime or hydrated lime, in a reaction called hydration or extinction reaction which is highly exothermic. In what follows, the calcium dihydroxide shall be simply referred to as calcium hydroxide.

The slaked lime can therefore contain the same impurities as those of quirk lime from which it is produced.

The slaked lime can also include $Mg(OH)_2$ in a quantity included within the range, from 0.5 to 10% by weight, preferably less than or equal to 5% by weight, more preferably less than or equal to 3% by weight, most preferably less than or equal to 1% by weight in relation to the total weight of the slaked lime.

The slaked lime can also include calcium oxide, which may not have been fully hydrated during the step of extinction, or calcium carbonate $CaCO_3$. The calcium carbonate can conic from the initial lime initial (unfired) from which said slaked lime is obtained (by the intermediary of the calcium oxide), or come from a partial carbonation reaction of slaked lime through contact with an atmosphere containing $CO_2$.

The quantity of calcium oxide in slaked lime according to this invention is generally less than or equal to 3% by weight, preferably less than or equal to 2% by weight and more preferably less than or equal to 1% by weight in relation to the total weight of the slaked lime.

The quantity of $CO_2$ in the slaked lime (mainly in the form of $CaCO_3$) according to this invention is less than or equal to 5% by weight, preferably less than or equal to 3% by weight, more preferably less than or equal to 2% by weight, in relation to the total weight off the slaked lime according to this invention.

In terms of this invention, the terms "lime slurry" means a suspension of solid particles of slaked lime in an aqueous phase at a concentration greater than or equal to 200 g/kg. The solid particles can obviously contain impurities, namely phases derived from $SiO_2$, $Al_2O_3$, $Fe_2O_3$, MnO, $P_2O_5$ and/or $SO_3$, globally representing a few dozen grams per kilogram. These solid particles can also contain calcium oxide that may not have been hydrated during the extinction, just as they may contain calcium carbonate $CaCO_3$ and/or magnesium carbonate $MgCO_3$, possibly combined in the form of dolomite.

By analogy, in terms of this invention, the terms "calcium particle slurry" means a suspension of solid calcium particles in an aqueous phase at a concentration greater than or equal to 200 g/kg.

Dolomite comprises both calcium carbonate and magnesium carbonate in variable proportions as well as various impurities. The firing of the dolomite causes the release of $CO_2$ (decarbonation) and a quick dolomitic product is obtained, namely comprised mostly of CaO and of MgO, although carbonates, especially $CaCO_3$, can subsist in more or less substantial quantities. During the extinction in order to produce an at least partially hydrated decarbonated dolomite, water is added in order to hydrate the quick portion of the decarbonated dolomite. As the avidity of CaO for water is much higher than that of MgO for water, it is often necessary, to hydrate under pressure, for example in an autoclave with as a result a product that is at least partially hydrated. It is indeed common for a portion of the MgO to remain in the form of MgO. The Ca/Mg proportions between the oxide, carbonate and hydrate portion are highly variable in the at least partially hydrated decarbonated dolomite.

The term "lime", means in terms of this invention a natural mineral material coming from lime ore or, when the properties have to be controlled, coming from the carbonation of the quick lime. Lime satisfies the general formula $CaCO_3$ and can obviously contain impurities.

In a preferred embodiment of this invention, said mineral suspension contains a calcium particle slurry containing calcium particles between 20 and 60% by weight in relation to the weight of said calcium particle slurry.

In a particularly preferred embodiment of the method according to this invention, said mineral suspension containing a calcium particle slurry is a lime slurry containing particles of slaked lime at a content between 20 and 60% by weight in relation to the weight of said lime slurry.

In this way, when the slag is poured, the slaked lime is transformed into quick lime due to the temperature of the slag (which can range up to 1,200° C.), which is greater than the dehydration temperature of the slaked lime (environ 500° C.). This transformation releases steam that can disbond the slag, poured at the many attaching points formed between the slag and the inner wall of the slag pot or ladle. This substantially reduces the total surface of the slag adhering to the mineral layer formed of particles of lime.

Even if the coating is applied and the slag pot or ladle is stored for an undetermined period of time, the mineral layer comprising calcium hydroxide is carbonated and is transformed as such into a layer of calcium carbonate. At the time when the slag is pored on the calcium carbonate, in light of the temperature of the slag greater than 1,200° C., the calcium carbonate is decarbonated and forms quick lime by releasing $CO_2$ and no longer steam (although the two phenomena can occur at the same time).

The specific concentration between 20 and 60% of particles of slaked lime in the lime slurry makes it possible, when the lime slurry is sprayed for a layer of slaked lime to be applied and to form a thin and homogenous layer, which does not significantly affect the concentration of slaked lime in the slag, but also which does not have the result of adding residual water to the slag, which is dangerous for the handling of the slag pot or ladle.

Indeed, as has been indicate hereinabove, when the lime slurry is sprayed, the temperature of the pot or of the ladle is greater than 100° C., which leads to the evaporation of the water contained in the lime slurry and as such leaves a layer of slaked lime particles. When the slag is poured into the coated slag pot or ladle, the particles of slaked lime of the mineral layer are transformed in situ, fully into quick lime. However, in one case as in the other, the stripping effect of the mineral layer makes it possible for the slag to be poured out at the landfill, taking with it the mineral layer and as such leaving the slag pot or ladle clean for the following operations. Consequently, the handling of slag pots or ladles is simplified because it is no longer required to proceed with the mechanical removal of the skull formed, or to bring, to the pot or the ladle to a temperature that is sufficient for the putting into service thereof. Once the slag has been deposited at the landfill, vaporising lime slurry again inside the pot is all that is necessary.

The finesse of the layer as well as the homogeneity thereof, being a consequence of the concentration and of the size of the particles of slaked lime in the lime slurry, is obviously of substantial importance in achieving the elimination of the mineral layer with the slag during the depositing in a landfill, but also simultaneously for achieving the "stripping effect".

Advantageously, said particles of lime in the lime slurry of said mineral aqueous phase have an average particle size $d_{50}$ between 1.5 μm and 10 μm.

Advantageously, said calcium particles in the calcium particle slurry of said mineral suspension have an average particle size $d_{50}$ less than or equal to 8 μm, in particular less than or equal to 6 μm, more particularly less than or equal to 5 μm, very particularly less than 4 μm.

Advantageously, said calcium particles in the calcium particle slurry of said mineral suspension have an average particle size $d_{59}$ greater than or equal to 2 μm, in particular greater than or equal to 2.5 μm.

The notation $d_X$ represents a diameter, expressed in μm, in relation to which X % of the particles or grains measured are smaller.

The finer the particles are, the better the reaction of releasing star or $CO_2$ is produced which allows for the disbonding of the slag such as indicated hereinabove.

In an embodiment of the method according to this invention, said calcium particle slurry has a viscosity between 0.1 Pa·s and 2 Pa·s, i.e. between 100 cps and 2000 cps. Advantageously the viscosity is greater than 0.15 Pa·s and less than 1 Pa·s, more preferably less than 0.6 Pa·s, more preferably less than 0.5 Pa·s, even more preferably less than 0.3 Pa·s.

The viscosity of a lime slurry is a determinant property with respect to the implementation and the handling (pumping, transport in pipes, etc.) of the suspension. For this purpose, experience has made it possible to establish that the dynamic viscosity of the suspension has to be less than 2 Pa·s (U.S. Pat. No. 5,616,283) and that it is desirable to not exceed a dynamic viscosity of 1.5 Pa·s (WO 2007110401).

The viscosity in the framework of this invention is measured using a Brookfield viscometer (rheometer) of the DV-III type at 100 rpm by using an LV no. 3 needle.

Advantageously, in the method according to this invention, said calcium particles of the calcium particle slurry have a particle size $d_{97}$ between 7 and 100 μm.

In this way, they are sufficiently fine to also contribute to the formation of a thin and homogeneous mineral layer which participates in simplifying the stripping of the slag.

Advantageously, said calcium particles of the calcium particle slurry have a particle size $d_{97}$ greater than or equal to 10 μm and less than or equal to 20 μm, in particular less than or equal to 15 μm.

The reactivity of lime slurries is characterised in terms of this invention according to European standard EN12485 (2010), § 6.11 "Determination of solubility index by conductivity". This method is itself derived from the work of van Eekeren and coll, disclosed in the document "Improved milk-of-lime for softening of drinking water", M. W. M. van Eekeren, J. A. M. van Paassen, C. W. A. M. Merks, KIWA NV Research and Consultancy, Nieuwegein, September 1993" produced and distributed by KIWA, Royal Dutch Institute for the analysis of water (KIWA NV Research and Consultancy, Groningenhaven 7, P.O. Box 1072, 3430BB Nieuwegein).

The reactivity of a lime slurry is therefore evaluated by the change over time in the measurement of the conductivity of a prepared solution by diluting a small quantity of lime slurry in a large volume of demineralised water. An identification is made in particular of the points corresponding to a conductivity of x % for x %=63%, 80%, 90% and 95% of the maximum conductivity at the final point (see EN12485 (2010) § 6.11.62). The corresponding dissolving time t(x %) in s, is then obtained from the conductivity vs. time graph (see FIG. 2 of EN12485 (2010)).

It is known that the rate of dissolving of the particles of lime in demineralised water is faster (t(x %) smaller) when the size of the particles is smaller. In other terms, the reactivity of the lime slurry is generally higher when its constituting particles are smaller.

In a preferred embodiment of the method according to this invention, when said mineral suspension contains or is a lime slurry, the latter has a reactivity expressed in the form of a dissolving time t(90%) greater than 0.1 s in particular greater than 0.2 s and less than 10 s, in particular less than 5 s.

When the lime slurry has such a reactivity, the particles of slaked lime have a particle size that is fine enough to also contribute to the formation of a thin mineral layer, in particular homogeneous, which participates in simplifying the stripping of the slag.

The stability of the calcium particle slurry or of the mineral suspension can be determined by using the stability method called the bottle test such as described in document WO 2001/096240

In a particular embodiment of this invention, said carbon hydrate is chosen in the group comprised of disaccharides, such as sucrose or saccharose, sorbitol, monosaccharides, oligosaccharides, xylose, glucose, galactose, fructose, mannose, lactose, maltose, glucuronic acid, gluconic acid, erythritol, xylitol, lactitol, maltitol, dextrins, cyclodextrins, inulin, glucitol, uronic add, rhamnose, arabinose, erythrose, threose, ribose, allose, trehalose, galacturonic acid, and mixtures thereof.

In a particularly preferred embodiment of the method according to this invention, said carbon hydrate is chosen in the group comprised of disaccharides, such as sucrose or saccharose, sorbitol and mixtures thereof.

In addition to the aspect of the reduced cost of these carbon hydrates, combined with their perfect compatibility with the lime slurry, these carbon hydrates are known to reduce the viscosity of the lime slurry and keep it low over time, thus facilitating the storage conditions of the lime slurry.

In the framework this application, this controlled and reliable viscosity is of fundamental importance in the facility of carrying out a homogeneous coating.

As mentioned hereinabove, the mineral suspension can also include additives, in particular dispersant or fluidifying additives, for example with a mass content between 0 and 5%, in relation to the weight of said mineral suspension. Preferably, the content of the aforementioned additives is less than or equal to 3%, in particular less than or equal to 2%, more particularly less than or equal to 1.5% in relation to the weight of said mineral suspension. Preferably, the content of the aforementioned additives is greater than or equal to 0.2%, advantageously greater than or equal to 0.5% in relation to the weight of said mineral suspension.

It is understood that several of the aforementioned additives can be present in said mineral suspension, with one or several carbon hydrates and possibly one or several dispersant or fluidifying agents.

These additives can be for example polymer or mineral additives such as for example anionic polymers or acid polymers, boric acid and water-soluble salts of boric acid, such as for example alkali metal borates, aluminium borates, $C_2$ to $C_{10}$ carboxylic acids, for example containing at least 2 acid groups and the salts of the latter, such as for example alkali metal salts or ammonia salts; hydroxides, carbonates, sulphates, nitrates, phosphates, ammonia or alkali metal silicates.

The term "anionic polymer" used in the framework of this invention describes all of the polymers containing acid groups, in a free, neutralised or partially neutralised form.

Examples of such anionic polymers, which are appropriate in the framework of this invention can be chosen from the anionic dispersants available off the shelf used for the production of mineral suspensions such as:

homopolymers prepared by using an acid monomer such as acrylic acid, methacrylic acid, maleic acid, maleic anhydride, fumaric acid, itaconic acid, itaconic anhydride, aconic acid, crotonic acid, isocrotonic acid, mesaconic acid, vinyl acetic acid, hydroxyacrylic acid, undecylenic acid, allyl sulphonic acid, vinyl sulphonic acid, allyl phosphonic acid, vinyl phosphonic acid, 2-acrylamido-2-methyl propane sulphonic acid or 2-acrylamidoglycolic acid.

copolymers prepared by using at least one monomer of the group mentioned hereinabove and possibly one or several non-acid monomers such as for example acrylamide, acrylic acid esters, acrolein, methacrylic acid esters, maleic acid esters, itaconic acid esters, fumaric acid esters, vinyl acetate, acrylonitrile, styrene, alpha-methyl styrene, N-vinyl pyrrolidone, 2-hydroxyethyl acrylate, 2-hydroxyethyl methacrylate, dimethylic acrylamide, N-(hydroxymethyl)acrylamide or vinyl formamide.

These polymers can be in the form of free acid, alkali metal salts, partially or integrally, mixed salts, soluble in water. The anionic polymers preferred are formed of acrylic acid with one or the other of the monomers chosen from acrylamide, dimethylacrylamide, methacrylic acid, maleic acid or AMPS (2-acrylamido-2-methylpropane sulphonic acid) in a preferred composition from 100:0 to 50:50 (by weight) and fully neutralised in the form of a sodium salt.

In a particular embodiment of this invention, said dispersant or agent fluidifiant is a phosphonate or phosphonic acid chosen from organophosphonic acids, nitrogen or not, or the salts thereof, more particularly in the group comprising aminoalkylene polyphosphonic acids, where the alkylene radical contains from 1 to 20 carbon atoms, hydroxyalkylidene polyphosphonic acids, wherein the alkyliden radical contains from 2 to 50 carbon atoms, phosphino-alcane-polycarboxylic acids, wherein the alkane group contains from 3 to 12 carbon atoms and wherein the molar ratio of the alkylphosphonic acid radical to the carboxylic acid radical is in the range of 1:2 to 1:4, the derivatives thereof, such as the salts thereof, and mixtures thereof.

In another particular embodiment of the invention, said phosphonate or phosphonic acid comprises, in the form of acid, from 2 to more preferably from 2 to 6 characteristic "phosphonic acid" groups.

More particularly, said phosphonate or phosphonic acid is chosen from the group comprising aminotris(methylenephosphonic) acid (ATMP), 1-hydroxyethylidene-1,1-diphosphonic acid (HEDP), ethylenediamine tetrakis(methylenephosphonic) acid (EDTMP), hexamethylenediamine tetrakis (methylenephosphonic) acid (HDTMP), diethylenetriamine pentakis(methylenephosphonic) acid (DTPMP), (2-hydroxy)ethylamino-N,N-bis(methylenephosphonic) acid (HEMPA), 2-phosphono-1,2,4-butanetricarboxylic acid (PBTC), 6-amino-1-hydroxyhexylene-N,N-diphosphonic acid (neridronic acid), N,N'-bis(3-aminopropyl)ethylenediamine hexakis(methylenephosphonic) acid, bis(hexamethylenetriamine) pentakis(methylenephosphonic) acid, oxide of aminotris(methylenephosphonic) acid, the derivatives thereof such as the salts thereof and the mixtures thereof.

More particularly, in addition to said one or several carbon hydrates, the lime slurry comprises at least one additive chosen from dispersants and fluidifying additives and mixtures thereof, such as polycarbonates or polyacrylates, or polyphosphonates, in particular DTPMP.

More particularly, in the method according to this invention, said lime slurry has a content in slaked lime particles greater than or equal to 25% by weight, preferably, greater than or equal to 27% by weight, preferably greater than or equal to 30% by weight, preferably greater than or equal to 35% by weight, in relation to the total weight of the lime slurry and a content in slaked lime particles loss than or equal to 56% by weight, preferably, less than or equal to 50% by weight, preferably less than or equal to 48% by weight, in relation to the total weight of the lime slurry.

More particularly, in the method according to this invention, said calcium particle slurry has a content in calcium particles greater than or equal to 25% by weight, preferably, greater than or equal to 27% by weight, preferably greater than or equal to by weight, preferably greater than or equal to 35% by weight, in relation to the total weight of the calcium particle slurry and a content in calcium particles less than or equal to 55% by weight, preferably, less than or equal to 50% by weight, preferably less than or equal to 48% by weight, in relation to the total weight of the calcium particle slurry.

Other embodiments of the method according to the invention are indicated in the annexed claims.

The invention also has for object a use of a mineral suspension for lining an inner wall of a slag pot or of a slag ladle with a mineral layer, wherein said mineral suspension is sprayed and has a content in carbon hydrate between 0.2 and 3% preferably between 0.4 and 2%, more preferably between 0.5 and 1.5%, more advantageously between 0.5% and 1% by weight in relation to the total weight of said mineral suspension.

As can be observed, when a mineral suspension having a carbon hydrate content between 0.2 and 3% by weight, in relation to the total weight of said mineral suspension, is lined on the inner wall of the slag pots or ladles, it was surprisingly observed that the slag that is poured therein did not adhere or adhered very little at the time of pouring out at the landfill. The mineral layer formed as such acts as a stripping agent forming a layer that substantially reduces the formation of skull via a substantial reduction in the adherence between the slag pot or ladle and the slag that is poured therein.

At the time of the spraying of the mineral suspension containing a carbon hydrate, the water contained in the suspension evaporates almost instantly in contact with the hot wall. This generates a rapid increase in the concentration of carbon hydrate until forming a priori a weak adhesive favouring the adherence of the calcium particles to the wall of the slag pot, due also to the temperature of the slag pot or ladle, which is greater than 100° C.

At the time of the pouring of the slag into the slag pot or ladle, at the furnace outlet, the temperature of the slag produces a calcining reaction of the carbon hydrate, which facilitates the stripping of the slag, with this phenomenon occurring starting at 700° C.

Indeed, the thin mineral layer formed by spraying typically makes it possible to produce a shear plane behind the mineral layer tat the interface between the inner wall of the slag pot or ladle and the mineral layer) at the time of the overflowing of the slag into the slag pot or ladle. The shear plane can be produced because the presence of the carbon hydrate plays the role of a weak adhesive, in comparison with the potential adherence of the slag to the inner wall of the slag pot or ladle.

Then, the mineral layer "glued" onto the inner wall of the slag pot or ladle is comprised of fine mineral particles. The temperature of the slag pot, or ladle, just before the overflowing of the slag has a temperature typically from 100° C. to 350° C., a temperature at which the mineral particles are stable. The mineral layer can therefore be applied onto the slag pot or ladle well before the use thereof. The slag pots or ladles coated as such, can even be stored.

Advantageously, said mineral layer has a layer thickness between 0.1 and 5 mm, preferably between 0.15 and 3 mm, more preferably between 0.2 and 2 mm, in particular between 0.5 and 1 mm.

In a particular form of use according to this invention, said mineral suspension contains calcium particles, chosen in the limited group comprising slaked lime, decarbonated dolomite at least partially slaked, lime and mixtures thereof and wherein the mineral layer is a layer of calcium particles.

In this case, if the calcium particles are slaked lime or at least partially hydrated decarbonated dolomite, at the time of the overflowing of the slag into the slag pot or ladle, at the furnace outlet, the temperature of the slag a priori produces a calcining reaction of the carbon hydrate simultaneously with the dehydration of the calcium hydrate which facilitates the stripping of the slag, these phenomena occur starting at 700° C.

Advantageously, the mineral suspension also comprises additives such as mentioned hereinabove.

In a preferred form of use, said mineral suspension contains a calcium particle slurry containing calcium particles between 20 and 60% by weight in relation to the weight of said calcium particle slurry.

In another preferred form of use, wherein said mineral suspension contains a calcium particle slurry is a lime slurry containing particles of slaked lime at a content between 20 and 60% by weight in relation to the weight of said lime slurry.

Preferably, said calcium particles in the calcium particle slurry of said mineral suspension have an average particle size $d_{50}$ between 1.5 μm and 10 μm.

Advantageously, said calcium particles in the calcium particle slurry of said mineral suspension have an average particle size $d_{50}$ less than or equal to 8 μm, in particular less than or equal to 6 μm, more particularly less than or equal to 5 μm, very particularly less than 4 μm.

Advantageously, said calcium particles in the calcium particle slurry of said mineral suspension have an average particle size $d_{50}$ greater than or equal to 2 μm, in particular greater than or equal to 2.5 μm.

In yet another preferred form of use, said carbon hydrate is chosen n the group comprised of disaccharides, such as sucrose or saccharose, sorbitol, monosaccharides, oligosaccharides, xylose, glucose, galactose, fructose, mannose, lactose, maltose, glucuronic acid, gluconic acid, erythritol, xylitol, lactitol, maltitol, dextrins, cyclodextrins, inulin, glucitol, uronic acid, rhamnose, arabinose, erythrose, threose, ribose, allow, trehalose, galacturonic acid, and mixtures thereof.

Preferably, said carbon hydrate is chosen in the group comprised of disaccharides, such as sucrose or saccharose, sorbitol and mixtures thereof.

More particularly, in addition to said one or several carbon hydrates, the lime slurry comprises at least one additive chosen from dispersants and fluidifying additives and mixtures thereof, such as polycarbonates or polyacrylates, or polyphosphonates, in particular DTPMP.

Advantageously, said calcium particle slurry has a viscosity between 0.1 Pa·s and 2 Pa·s.

In a preferred use of this invention, said calcium particles of the calcium particle slurry have a particle size $d_{97}$ between 7 and 100 μm.

More particularly, when said mineral suspension comprises or is a lime slurry, said lime slurry has a content in slaked lime particles greater than or equal to 25% by weight, preferably, greater than or equal to 27% by weight, preferably greater than or equal to 30% by weight, preferably greater than or equal to 35% by weight, in relation to the total weight of the lime slurry and a content in slaked lime particles less than or equal to 55% by weight, preferably, less than or equal to 50% by weight, preferably less than or equal to 48% by weight, in relation to the total weight of the lime slurry.

Alternatively, said calcium particle slurry has a content in calcium particles greater than or equal to 25% by weight, preferably, greater than or equal to 27% by weight, preferably greater than or equal to 30% by weight, preferably greater than or equal to 35% by weight, in relation to the total weight of the calcium particle slurry and a content in calcium particles less than or equal to 56% by weight, preferably, less than or equal to 50% by weight, preferably less than or equal to 48% by weight, relation to the total weight of the calcium particle slurry.

Other forms of use according to this invention are mentioned in the annexed claims.

This invention also relates to a method for handling a pyro-metallurgical tool comprising an inner wall and an outer wall, said method comprising the steps of a) Using said pyro-metallurgical tool,
   b) Cleaning said pyro-metallurgical tool,
   c) Spraying of a mineral suspension onto said inner wall and/or onto said outer wall of said pyre-metallurgical tool, prior to at least one step of using said pyro-metallurgical tool, in such a way as to line said inner wall and/or said outer wall with a mineral layer, and
   d) putting in service of said pyro-metallurgical tool of which said inner wall and/or said outer wall is lined with said mineral layer with a view to the use thereof a).

Said outer wall is sometimes also "shell".

Such pyro-metallurgical tools are for example refining tools such as cast iron desulphurisation tools, converters that transform the cast iron into steel (BOF), electric furnaces (EAF), stainless steel refining converters (AOD) and the various tools for secondary metallurgy grading, but also crucibles and shells or similar items generally used.

The method for handling pyro-metallurgical tools described hereinabove is characterised in that said mineral layer is a thin layer and in that said mineral suspension comprises an aqueous phase, a mineral phase and possibly additives, said mineral suspension has a carbon hydrate content between 0.2 and 3% preferably between 0.4 and 2%, more preferably between 0.5 and 1.5%, more advantageously between 0.5% and 1% by weight in relation to the total weight of said mineral suspension.

As can be observed, when a mineral suspension having a carbon hydrate content between 0.2 and 3% by weight, in relation to the total weight of said mineral suspension, is lined on the inner wall and/or the outer wall of the pyro-metallurgical tools, it was surprisingly observed that the handling frequency of these pro-metallurgical tools was substantially reduced and easier.

In a preferred form of the method according to this invention, said mineral phase contains calcium particles, chosen from the group comprised of slaked lime, decarbonated dolomite at least partially slaked, lime and mixtures thereof.

In a particular embodiment, said mineral suspension contains a calcium particle slurry containing calcium particles between 20 and 60% by weight in relation to the weight of said calcium particle slurry.

In another particular embodiment, said mineral suspension contains a calcium particle slurry is a lime slurry containing particles of slaked lime at a content between 20 and 60% by weight in relation to the weight of said lime slurry.

More particularly, according to this invention, said calcium particles in the calcium particle slurry of said aqueous phase have an average particle size $d_{50}$ between 1.5 μm and 10 μm.

Advantageously, said calcium particles in the calcium particle slurry of said mineral suspension have an average particle size $d_{50}$ less than or equal to 8 μm, in particular less than or equal to 6 μm, more particularly less than or equal to 5 μm, very particularly less than 4 μm.

Advantageously, said calcium particles in the calcium particle slurry of said mineral suspension have an average particle size $d_{50}$ greater than or equal to 2 μm, in particular greater than or equal to 2.5 μm.

Advantageously, in the method according to this invention, said carbon hydrate is chosen in the group comprised of disaccharides, such as sucrose or saccharose, sorbitol, monosaccharides, oligosaccharides, xylose, glucose, galactose, fructose, mannose, lactose, maltose, glucuronic acid, gluconic acid, erythritol, xylitol, lactitol, maltitol, dextrins, cyclodextrins, inulin, glucitol, uronic acid, rhamnose, arabinose, erythrose, threose, ribose, allose, trehalose, galacturonic acid, and mixtures thereof.

More particularly, method according to this invention, said carbon hydrate is chosen in the group comprised of disaccharides, such as sucrose or saccharose, sorbitol and mixtures thereof.

Preferably, said calcium particle slurry has a viscosity between 0.1 Pa·s and 2 Pa·s.

More preferably, said calcium particles of the calcium particle slurry have a particle size $d_{97}$ between 7 and 100 μm.

The reactivity of lime slurries is characterised in terms of this invention according to European standard EN12465 (2010), § 6.11 "Determination of solubility index by conductivity". This method is itself derived from the work of van Eekeren and coll, disclosed in the document "'Improved milk-of-lime for softening of drinking water', M. W. M. van Eekeren, J. A. M. van Paassen, Marks, KIWA NV Research and Consultancy, Nieuwegein, September 1993" produced and distributed by KIWA, Royal Dutch Institute for the analysis of water (KIWA NV Research and Consultancy, Groningenhaven 7, P.O. Box 1012, 3430BB Nieuwegein).

The reactivity of a lime slurry is therefore evaluated by the change over time in the measurement of the conductivity of a prepared solution by diluting a small quantity of lime slurry in a large volume of demineralised water. An identification is made in particular of the points corresponding to a conductivity of x % for x %=63%, 80%, 90% and 95% of the maximum conductivity at the final point (see EN12485 (2010) § 6.11.6.2). The corresponding dissolving time t(x %) in s, is then obtained from the conductivity vs. time graph (see FIG. 2 of EN12485 (2010)).

It is known that the rate of dissolving of the particles of lime in demineralised water is faster (t(x %) smaller) when the size of the particles is smaller. In other terms, the reactivity of the lime slurry is generally higher when its constituting particles are smaller.

In a preferred embodiment of the method according to this invention, when said mineral suspension contains or is a lime slurry, the latter has a reactivity expressed in the form of a dissolving time t(90%) greater than 0.1 s in particular greater than 0.2 s and less than 10 s, in particular less than 5 s.

When the lime slurry has such a reactivity, the particles of slaked line have a particle size that is fine enough to also contribute to the formation of a thin mineral layer, in particular homogeneous, which participates in simplifying the stripping of the slag.

The stability of the calcium particle slurry or of the mineral suspension can be determined by using the stability method called the bottle test such as described in document WO 2001/096240.

Preferably, said additives of said mineral suspension are chosen in the group comprising dispersants and fluidifying additives and mixtures thereof, such as polycarbonates or polyacrylates, or polyphosphonates, in particular DTPMP.

The dispersants or fluidifying agents that can be used in the framework of this invention have been mentioned hereinabove.

It is understood that several of the aforementioned additives can be present in said mineral suspension, in particular one or several carbon hydrates with one or several dispersants or fluidifying agents.

More particularly, said lime slurry has a content in slaked lime particles greater than or equal to 25% by weight, preferably, greater than or equal to 27% by weight, preferably greater than or equal to 30% by weight, preferably greater than or equal to 35% by weight, in relation to the total weight of the lime slurry and a content in slaked lime particles less than or equal to 55% by weight, preferably, less than or equal to 50% by weight, preferably less than or equal to 48% by weight, in relation to the total weight of the lime slurry.

Advantageously, said calcium particle slurry has a content in calcium particles greater than or equal to 25% by weight, preferably, greater than or equal to 27% by weight, preferably greater than or equal to 30% by weight, preferably greater than or equal to 35% by weight, in relation to the total weight of the calcium particle slurry and a content in calcium particles less than or equal to 55% by weight, preferably, less than or equal to 50% by weight, preferably less than or equal to 48% by weight, in relation to the total weight of the calcium particle slurry.

In another preferred embodiment according to this invention, said mineral layer, lined on the inner wall and/or on the outer wall has a layer thickness between 0.1 and 5 mm, preferably between 0.15 and 3 mm, more preferably between 0.2 and 2 mm, in particular between 0.5 and 1 mm.

Other embodiments of the method of handling pyrometallurgical tools are indicated in the annexed claims.

This invention also finally relates to a use of a mineral suspension for lining an inner wall and/or an outer wall with a mineral layer of a pyro-metallurgical tool in order to reduce the handling frequency of said pyro-metallurgical tool, wherein said mineral suspension is sprayed and has a content in carbon hydrate between 0.2 and 3% preferably between 0.4 and 2%, more preferably between 0.5 and 1.5%, more advantageously between 0.5% and 1% by weight in relation to the total weight of said mineral suspension.

As can be observed, when a mineral suspension having a carbon hydrate content between 0.2 and 3% by weight, in relation to the total weight of said mineral suspension, is lined on the inner wall and/or the outer wall of the pyrometallurgical tools, it was surprisingly observed that the handling frequency of these pyro-metallurgical tools was substantially reduced and easier.

In a preferred use according to this invention, said mineral phase contains calcium particles, chosen from the group comprised of slaked lime, decarbonated dolomite at least partially slaked lime and mixtures thereof.

In a particular use, said mineral suspension contains a calcium particle slurry containing calcium particles between 20 and 60% by weight in relation to the weight of said calcium particle slurry.

In another particular use, said mineral suspension contains a calcium particle slurry is a lime slurry containing particles of slaked lime at a content between 20 and 60% by weight in relation to the weight of said lime slurry.

More particularly, according to this invention, said calcium particles in the calcium particle slurry of said aqueous phase have an average particle size $d_{50}$ between 1.5 µm and 10 µm.

Advantageously, said calcium particles in the calcium particle slurry of said mineral suspension have an average particle size $d_{50}$ less than or equal to 8 µm, in particular less than or equal to 6 µm, more particularly less than or equal to 6 µm, very particularly less than 4 µm.

Advantageously, said calcium particles in the calcium particle slurry of said mineral suspension have an average particle size $d_{50}$ greater than or equal to 2 µm, in particular greater than or equal to 2.6 µm.

Advantageously, in the use according to this invention, said carbon hydrate is chosen in the group comprised of disaccharides, such as sucrose or saccharose, sorbitol, monosaccharides, oligosaccharides, xylose, glucose, galactose, fructose, mannose, lactose, maltose, glucuronic acid, gluconic acid, erythritol, xylitol, lactitol, maltitol, dextrins, cyclodextrins, inulin, glucitol, uronic acid, rhamnose, arabinose, erythrose, threose, ribose, allose, trehalose, galacturonic acid, and mixtures thereof.

More particularly, in the use according to this invention, said carbon hydrate is chosen in the group comprised of disaccharides, such as sucrose or saccharose, sorbitol and mixtures thereof.

Preferably, said calcium particle slurry has a viscosity between 1 Pa·s and 2 Pa·s, i.e. between 100 cps and 2,000 cps.

More preferably, said calcium particles of the calcium particle slurry have a particle size day between 7 and 100 µm.

The reactivity of lime slurries is characterised in terms of this invention according to European standard EN12485 (2010), § 6.11 "Determination of solubility index by conductivity". This method is itself derived from the work of van Eekeren and coll, disclosed in the document "'Improved milk-of-lime for softening of drinking water', M. W. M. van Eekeren, J. A. M. van Paassen, C. W. A. M. Merks, KIWA NV Research and Consultancy. Nieuwegein. September 1993" produced and distributed by KIWA, Royal Dutch Institute for the analysis of water (KIWA NV Research and Consultancy, Groningenhaven 7. P.O. Box 1072, 3430BB Nieuwegein).

The reactivity of a lime slurry is therefore evaluated by the change over time in the measurement of the conductivity of a prepared solution by diluting a small quantity of lime slurry in a large volume of demineralised water. An identification is made in particular of the points corresponding to a conductivity of x % for x %=63%, 80%, 90% and 95% of the maximum conductivity at the final point (see EN12485 (2010) § 6.11.6.2). The corresponding dissolving time t(x %) in s, is then obtained from the conductivity vs. time graph (see FIG. 2 of EN12485 (2010)).

It is known that the rate of dissolving of the particles of lime in demineralised water is faster (t(x %) smaller) when the size of the particles is smaller. In other terms, the reactivity of the lime slurry is generally higher when its constituting particles are smaller.

In a preferred embodiment of the method according to this invention, when said mineral suspension contains or is a lime slurry, the latter has a reactivity expressed in the form of a dissolving time t(90%) greater than 0.1 s in particular greater than 0.2 s and less than 10 s, in particular less than 5 s.

When the lime slurry has such a reactivity, the particles of slaked lime have a particle size that is fine enough to also contribute to the formation of a thin mineral layer, in particular homogeneous, which participates in simplifying the stripping of the slag.

The stability of the calcium particle slurry or of the mineral suspension can be determined by using the stability method called the bottle test such as described in document WO 2001/096240.

Preferably, said additives of said mineral suspension are chosen in the group comprising dispersants and fluidifying additives, such as polycarbonates or polyacrylates, or polyphosphonates, in particular DTPMP.

The dispersants or fluidifying agents that can be used in the framework of this invention have been mentioned hereinabove.

More particularly, said lime slurry has a content in slaked lime particles greater than or equal to 25% by weight, preferably, greater than or equal to 27% by weight preferably greater than or equal to 30% by weight, preferably greater than or equal to 35% by weight, in relation to the total weight of the lime slurry and a content in slaked lime particles less than or equal to 55% by weight, preferably, less than or equal to 50% by weight, preferably less than or equal to 48% by weight, in relation to the total weight of the lime slurry.

Advantageously, said calcium particle slurry has a content in calcium particles greater than or equal to 25% by weight, preferably, greater than or equal to 27% by weight, preferably greater than or equal to 30% by weight, preferably greater than or equal to 35% by weight, relation to the total weight of the calcium particle slurry and a content in calcium particles less than or equal to 55% by weight, preferably, less than or equal to 50% by weight, preferably less than or equal to 48% by weight, in relation to the total weight of the calcium particle slurry.

In another preferred embodiment according to this invention, said mineral layer, lined on the inner wall and/or on the outer wall has a layer thickness between 0.1 and 5 mm, preferably between 0.15 and 3 mm, more preferably between 0.2 and 2 mm, in particular between 0.5 and 1 mm.

Other forms of use are indicated in the annexed claims.

Other characteristics, details and advantages of the invention shall appear in the description given hereinafter, in a non-limiting manner and in reference to the examples.

EXAMPLES

Examples 1 to 3

Test (Laboratory) of Aptitude for Coating

Tests were carried out in order to determine the effects of the spraying of mineral suspensions containing calcium particles and a carbon hydrate on hot metal surfaces.

To do this, various calcium suspensions such as indicated in table 1.—were sprayed by compressed air onto thick steel sheets. The dispersant agent, non-limiting of this invention, is the Neomere®Tech 646 marketed by Chryso. These steel sheets several centimetres thick were heated beforehand to 300° C. in an electrical resistance furnace and uncontrolled atmosphere in order to approach industrial conditions as much as possible.

TABLE 1

| Calcium suspension | Nature of the calcium particles | $d_{50}$ (μm) | Calcium particle content (% by weight of the suspension) | Additives (nature and mass content) |
| --- | --- | --- | --- | --- |
| Ex1 | Ca(OH)2 | 2.67 | 46.3 | Saccharose, 0.75% by weight of the suspension; dispersant agent, 0.4% by weight of the suspension |
| Ex2 | Ca(OH)2 | 2.67 | 27.1 | Saccharose, 0.44% by weight of the suspension; dispersant agent, 0.23% by weight of the suspension |
| Ex3 | Ca(OH)2 | 7.49 | 30.4 | Saccharose, 0.75% by weight of the suspension; dispersant agent; 0.6% by weight of the suspension |

The suspensions of examples 1 to 3 had, surprisingly a substantial ability for the coating, of hot metal surfaces. This effect was all the more so reinforced in the case of suspensions having a solid fraction of which the particle size was fine.

As a complement, the mechanical resistance of the coatings was evaluated using scraping and vibration tests. The mechanical resistance of the coated layers evaluated as such is also directly according to the aforementioned parameters. These elements refer to the "weak adhesive" effect described hereinabove.

The scraping tests consist in indenting the coated layer using a metal tool such as a laboratory spatula. No phenomenon of peeling or of the complete disappearance of the layer at the indented location was observed for the suspensions of examples 1 to 3.

The vibration tests consist of having the coated sheets undergo impacts by having them enter into collision with a fixed point (frame). Following the impacts and persistent vibrations subsequently, no phenomenon of spoiling of the solid mineral layer was observed.

Comparative Examples 1 to 5

Test (Laboratory) of Aptitude for Coating

Tests were carried out in order to determine the effects of the spraying of mineral suspensions containing calcium particles without carbon hydrate on hot metal surfaces.

To do this, various calcium suspensions such as indicated in table 2.—were sprayed by compressed air onto thick steel plates by following the procedure of examples 1 to 3.

TABLE 2

| Calcium suspension | Nature of the calcium particles | $d_{50}$ (µm) | Calcium particle content (% by weight of the suspension) | Additive (nature and mass content) |
|---|---|---|---|---|
| EC 1 | Ca(OH)2 | 7.49 | 30.4 | None |
| EC 2 | Ca(OH)2 | 5.90 | 40.4 | DTPMP, 0.25% by weight of the suspension |
| EC 3 | Ca(OH)2, MgO | 9.76 | 30.0 | None |
| EC 4 | Ca(OH)2, MgO | 8.69 | 40.0 | None |
| EC 5 | Ca(OH)2, MgO | 7.37 | 45.0 | None |

During the scraping tests, a phenomenon of peeling or of the complete disappearance of the layer at the indented location was observed for all of the suspensions of comparative examples 1 to 5.

During the vibration tests, phenomena of spelling and of spraying of the solid layer were able to be observed in the case of comparative examples 1 to 5.

Example 4

Tests (Laboratory) for the Evaluation of the Stripping Effect

The calcium suspensions of examples 1 to 3 having the most substantial ability for the coating of hot steel sheets, were the object of a test aiming to determine the ability of the coatings carried out to provoke a stripping effect in contact with steel-making slag (and, through the same, to prevent the formation of skull in slag pots).

In preparation for these tests, cast iron plates coated using calcium suspensions of examples 1 to 3. This preparation made it possible to confirm on the cast iron plates the results obtained hereinabove on steel sheets. The three calcium suspensions of examples 1 to 3 were used for the mating of three cast iron plates. A study was also done on the case of a bare cast iron plate and a cast iron plate coated with a suspension of siliceous material available off the shelf (comparative example) and used in the type of in application described hereinabove.

Several thickness of mineral layer were studied: 110 µm, 160 µm, 180 µm and 210 µm.

Converter slag (Basic Oxygen Furnace) was melted to 1,650° C. and then poured over the 5 plates that were prepared according to the description hereinabove.

Qualitatively, the stripping effect was present for all of the plates coated using the mineral suspension of examples 1 to 3. The coatings obtained using the calcium suspensions of examples 1 to 3 have shown a more pronounced stripping effect than the a coating obtained using the siliceous suspension.

In addition, surprisingly, the coatings obtained with a base of calcium suspensions showed a substantial advantage in terms of industrial application. As such, the coatings obtained with a calcium suspension base showed a substantial trend of adhering to the slag (and not to the plate) which is a sought effect in the industrial application in order to avoid causing fouling in the slag pots.

This effect was all the more so pronounced when the layer applied was thin.

In addition, no distribution within the slag of the chemical elements comprising the coating was observed. This reinforces the idea that the stripping effect is caused by a dehydration or decarbonation reaction of the coating and not by any such chemical transformation of the coating/slag interface.

Example 5

Industrial Tests

Based on results obtained in the laboratory, industrial validation tests were carried out.

A calcium suspension as lined on the inner wall in industrial slag pots and this, with different thicknesses. The calcium suspension chosen is the calcium suspension of the example 1, namely the one having the best laboratory results in terms of its ability for coating as well as the ability to provoke a stripping effect.

Said slag pots used in the framework of these tests correspond perfectly with the description that was given of them hereinabove.

In the framework of these tests, two types of means of application were used. In a first approach, a manual method of application using a compressed air vaporiser was used. Based on the results obtained, a second automatic method of application was used.

Regardless of the method of application, the effects of the following thicknesses of coatings were evaluated: 200 µm, 250 µm, 300 µm (400 µm and 500 µm to a lesser degree).

The results obtained on the industrial scale confirmed the results obtained in the laboratory in the framework of the two tests described hereinabove, indeed, the calcium suspension chosen confirmed:
- its ability for homogeneous and uniform coating of industrial slag pots and this, homogeneously regardless of the method of application used or the coated thickness;
- its ability to provoke a stripping effect in contact with steel-making slag with in this area a preference for a coating thickness of approximately 300 µm;
- its ability to adhere the steel-making slag after stripping leaving as such a relatively cleat metal surface with in this area a preference for the smallest thicknesses.

It is well understood that this invention is in no way limited to the embodiments described hereinabove and that many modifications can be made thereto without leaving the scope of the annexed claims.

The invention claimed is:

1. A method for handling a slag pot or ladle having a given temperature and having an inner wall and an outer wall, said method comprising the steps of
   a) spraying a mineral suspension on said inner wall, the temperature of said slag pot or ladle being greater than 100° C., so as to line said inner wall with a mineral layer, prior to the steps of:
   b) collecting a slag in said slag pot or ladle, lined on its inner wall with said mineral layer, of a gyro-metallurgical tool,
   c) transporting said slag pot or ladle from said pyrometallurgical tool to a slag drop-off site,
   d) emptying said slag pot or ladle at said slag drop-off site in order to eliminate the slag contained in said slag pot or ladle,
   wherein step a) is performed with the purpose of putting into service said slag pot or ladle lined with said mineral layer in order to repeat steps b) to d), and
   wherein said mineral layer is a thin layer lined on the inner wall, having a layer thickness between 0.1 and 5 mm, and in that said mineral suspension comprises an aqueous phase and a mineral phase, said mineral suspension having a carbon hydrate content between 0.2 and 3% by weight relative to the total weight of said mineral suspension; and wherein said mineral suspension comprises one or several additives selected from the group consisting of dispersants, fluidifying additives and mixtures thereof, and wherein said dispersants and fluidifying additives are selected from the group consisting of polycarbonates, polyacrylates and polyphosphonates.

2. The method of claim 1, wherein said mineral suspension contains a calcium particle slurry containing calcium particles, said calcium particles having an average particle size $d_{50}$ between 1.5 µm and 10 µm.

3. The method of claim 1, wherein said carbon hydrate is selected from the group consisting of sucrose, saccharose, sorbitol, xylose, glucose, galactose, fructose, mannose, lactose, maltose, glucuronic acid, gluconic acid, erythritol, xylitol, lactitol, maltitol, dextrins, cyclodextrins, inulin, glucitol, uronic acid, rhamnose, arabinose, erythrose, threose, ribose, allose, trehalose, galacturonic acid, and mixtures thereof.

4. The method of claim 3, wherein said carbon hydrate is selected from the group consisting of sucrose, saccharose, sorbitol and mixtures thereof.

5. The method of claim 1, wherein said mineral suspension contains a calcium particle slurry, said calcium particle slurry has a viscosity between 0.1 Pa·s and 2 Pa·s.

6. The method of claim 1, wherein said mineral suspension contains a calcium particle slurry containing calcium particles, said calcium particles of the calcium particle slurry have a particle size $d_{97}$ between 7 and 100 µm.

7. The method of claim 6, wherein said mineral suspension contains a calcium particle slurry, which is a lime slurry containing particles of slaked lime at a content between 20 and 60% by weight relative to the total weight of said lime slurry and wherein said lime slurry has a reactivity expressed in the form of a dissolving time t(90%) greater than 0.1 s.

8. A method for lining an inner wall of a slag pot or of a slag ladle with a mineral layer using a mineral suspension, wherein said mineral suspension is sprayed and has a content in carbon hydrate between 0.2 and 3% by weight, relative to the total weight of said mineral suspension, and wherein said mineral layer has a layer thickness between 0.1 and 5 mm; and wherein said mineral suspension comprises one or several additives selected from the group consisting of dispersants, fluidifying additives and mixtures thereof and wherein said dispersants and fluidifying additives are selected from the group consisting of polycarbonates, polyacrylates and polyphosphonates.

9. The method of claim 8, wherein said mineral suspension contains a calcium particle slurry containing calcium particles between 20 and 60% by weight relative to the total weight of said calcium particle slurry.

10. The method of claim 9, wherein said calcium particles in the calcium particle slurry of said mineral suspension have an average particle size $d_{50}$ between 1.5 µm and 10 µm.

11. The method of claim 8, wherein said carbon hydrate is selected from the group consisting of sucrose, saccharose, sorbitol, xylose, glucose, galactose, fructose, mannose, lactose, maltose, glucuronic acid, gluconic acid, erythritol, xylitol, lactitol, maltitol, dextrins, cyclodextrins, inulin, glucitol, uronic acid, rhamnose, arabinose, erythrose, threose, ribose, allose, trehalose, galacturonic acid, and mixtures thereof.

12. The method of claim 11, wherein said carbon hydrate is selected from the group consisting of sucrose, saccharose, sorbitol and mixtures thereof.

13. The method of claim 11, wherein said calcium particle slurry has a viscosity between 0.1 Pa·s and 2 Pa·s.

14. The method of claim 13, wherein said calcium particles of the calcium particle slurry have a particle size $d_{97}$ between 7 and 100 µm.

* * * * *